Sept. 26, 1944.  V. E. HOFMANN ET AL  2,359,216
MOLDING MACHINE
Filed April 29, 1941  5 Sheets-Sheet 1

INVENTORS
V. E. Hofmann and
J. M. Blank,
BY
Rule & Hoge
ATTORNEYS

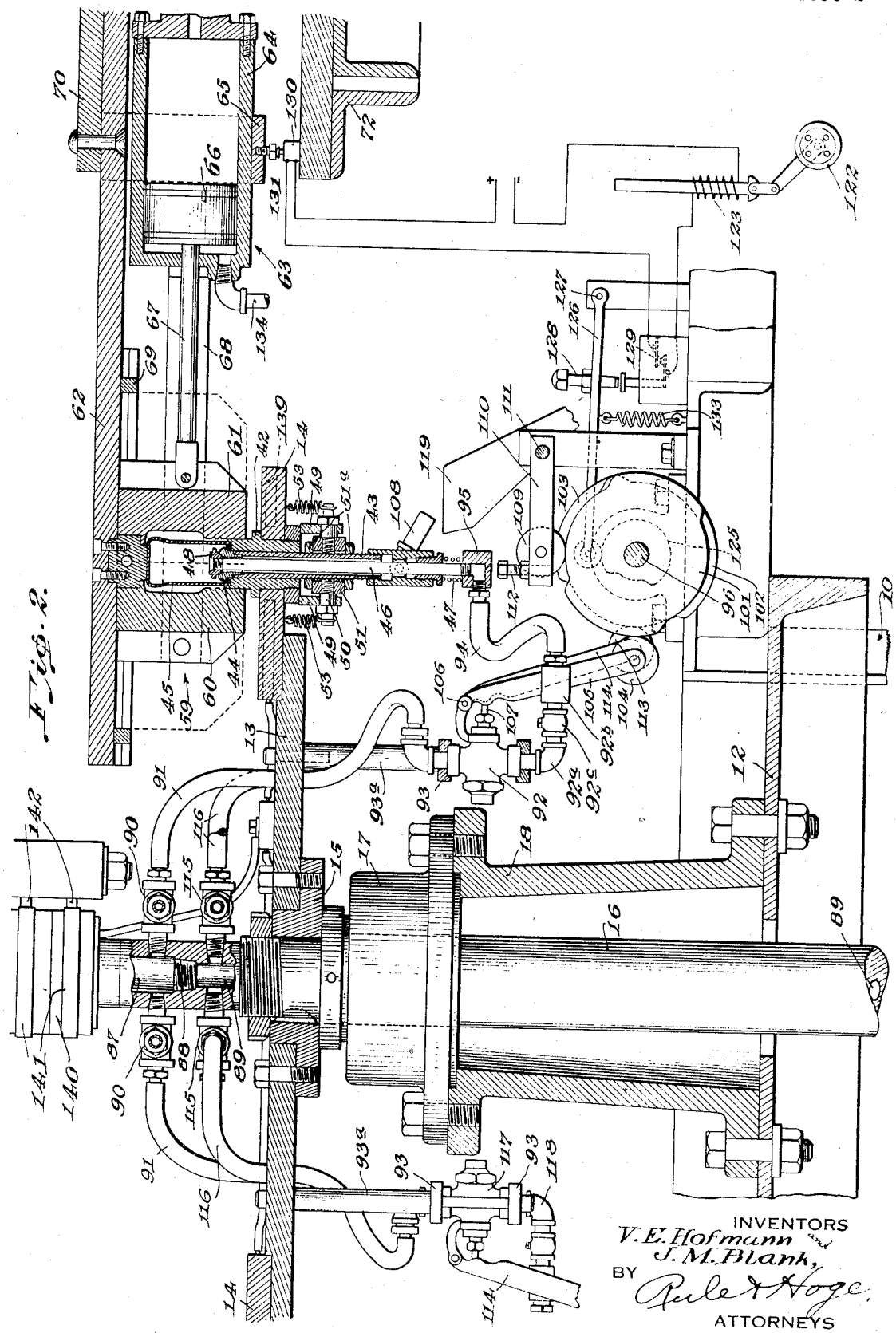

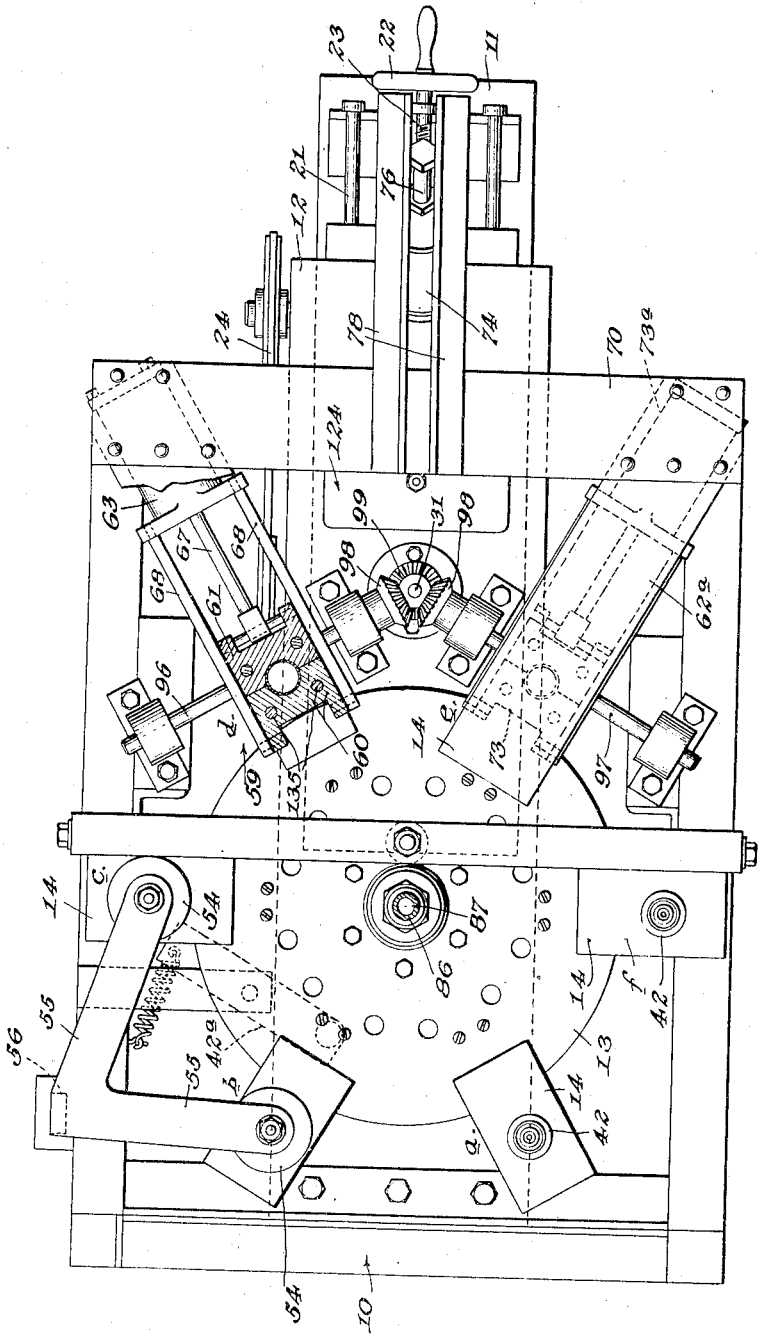

Sept. 26, 1944. V. E. HOFMANN ET AL 2,359,216
MOLDING MACHINE
Filed April 29, 1941 5 Sheets-Sheet 4
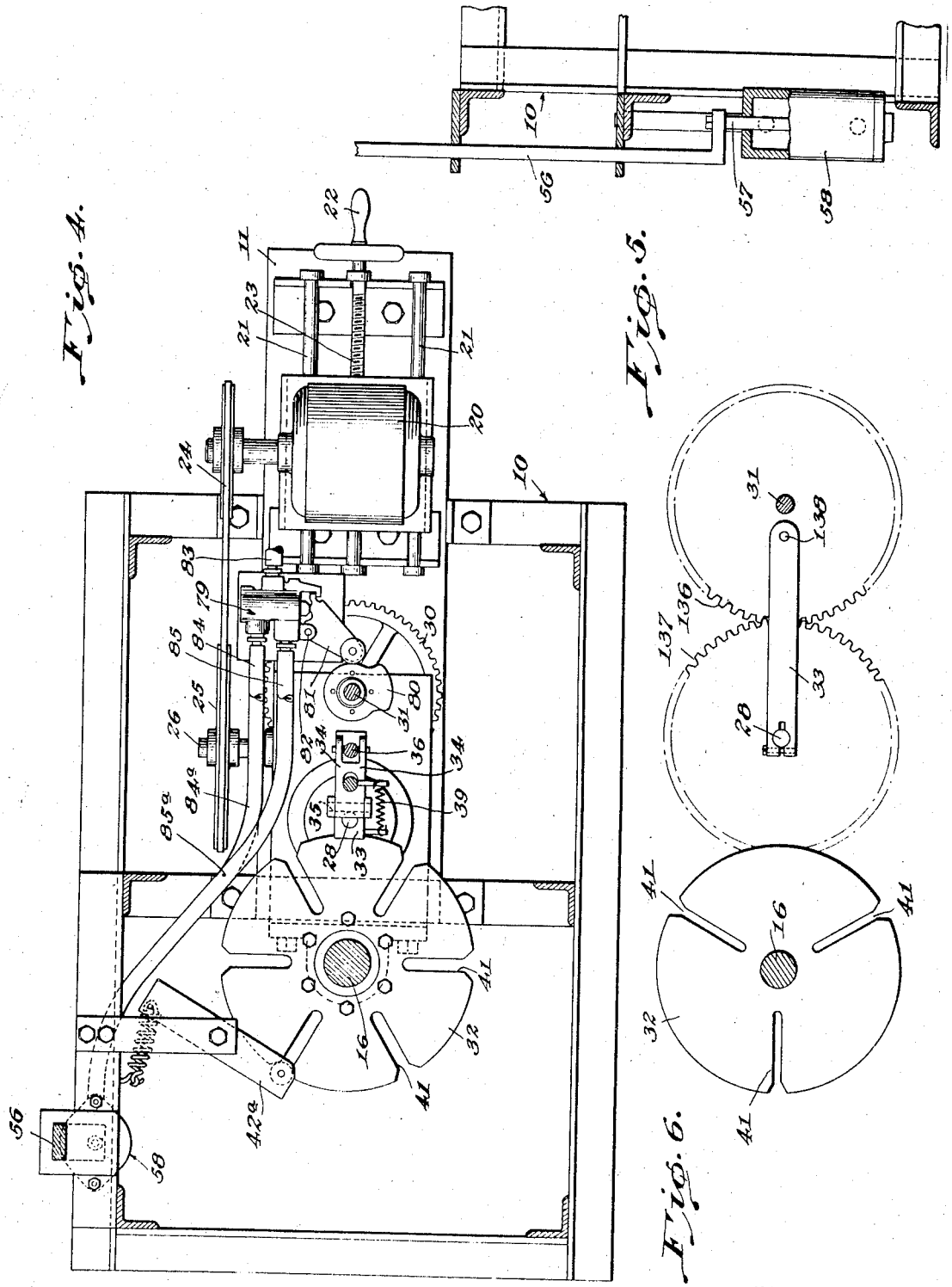
INVENTORS
V. E. Hofmann
J. M. Blank,
BY
Rule & Hoge
ATTORNEYS

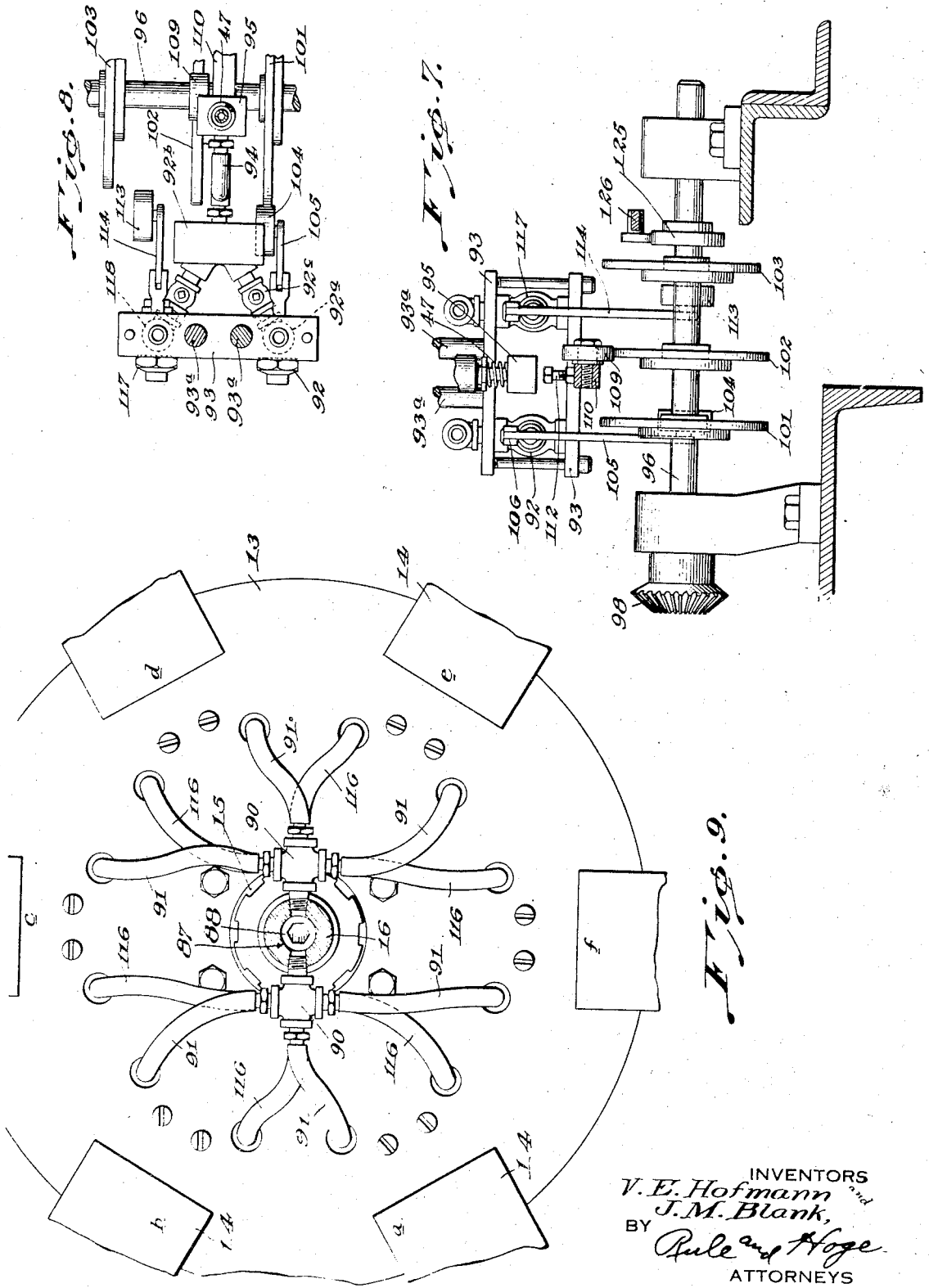

Patented Sept. 26, 1944

2,359,216

UNITED STATES PATENT OFFICE 2,359,216

MOLDING MACHINE

Victor E. Hofmann and John M. Blank, Toledo, Ohio, assignors to Owens-Illinois Glass Company, a corporation of Ohio Application April 29, 1941, Serial No. 390,934

17 Claims. (Cl. 18—5)

Our invention relates to mechanism for making hollow articles of thermoplastic material such as organic thermoplastics which are softened when heated so that they can be molded or blown to desired shapes and then cooled and hardened.

In the patent to Victor E. Hofmann, No. 2,348,738, May 16, 1944, Making hollow thermoplastic ware, there is disclosed a method by which blanks or preforms of such thermoplastic materials may be heated to render them soft and plastic, then blown to finished form in a mold and quickly cooled and set within the mold by the application of a cooling fluid to the interior of the article while supported in the mold.

An object of the present invention is to provide a machine which is largely automatic in its operation, designed for producing articles by such method rapidly and efficiently.

Thermoplastic materials adapted for making hollow articles vary widely in their characteristics and working requirements such as the temperatures at which they must be worked, softening temperatures, setting temperatures, heat conductivity and rate of heating and cooling, and length of time required for molding and curing in the molds. Working conditions and requirements also differ greatly for different articles, depending upon size and shape of the articles, the thickness of the walls of the articles, as well as the materials of which they consist. An object of the present invention is to provide a machine which is readily adjustable to meet these various requirements, thereby adapting it to the manufacture of a wide variety of thermoplastic articles and for use with various molding materials.

A further object of the invention is to provide a machine comprising an intermittently rotating carriage on which the hollow blanks are placed and each brought to a number of operating stations in succession at which the several operations of the method are effected, including a heating station at which the blanks are enclosed in a heating chamber and heated to render them plastic, a blowing station at which the softened blanks are blown within a mold to finished form, a cooling station at which the articles are cooled in a cooling mold, and mechanism by which the various operations are carried out and synchronized.

A further object of the invention is to provide a machine including a plurality of heating stations and a plurality of molding stations together with an intermittently rotating carriage by which the blanks of thermoplastic material may be brought in succession to the heating and molding stations for the several operations, said machine being adaptable with minor adjustments for fabricating the articles in groups, a plurality of blanks being simultaneously heated at the several heating stations and then transferred in a group to the several molding stations, and the molding and cooling operations for the several blanks being effected concurrently at said molding stations.

Other objects of the invention will appear hereinafter.

Referring to the accompanying drawings:

Fig. 2 is a fragmentary sectional elevation of the upper portion of the machine, the section being taken through a blow mold.

Fig. 3 is a plan view of the machine, one of the molds being shown in section.

Fig. 4 is a sectional plan view showing particularly the driving mechanism for the work carriage and cam shafts.

Fig. 5 is a part-sectional elevation showing a piston motor for lifting the heating drums.

Fig. 6 is a diagrammatic plan view of a modified form of driving mechanism.

Fig. 7 is a fragmentary elevation showing valves and their operating cams controlling the blowing and cooling operations.

Fig. 8 is a plan view of the same.

Fig. 9 is a sectional plan showing particularly the rotary work table.

Figure 1:
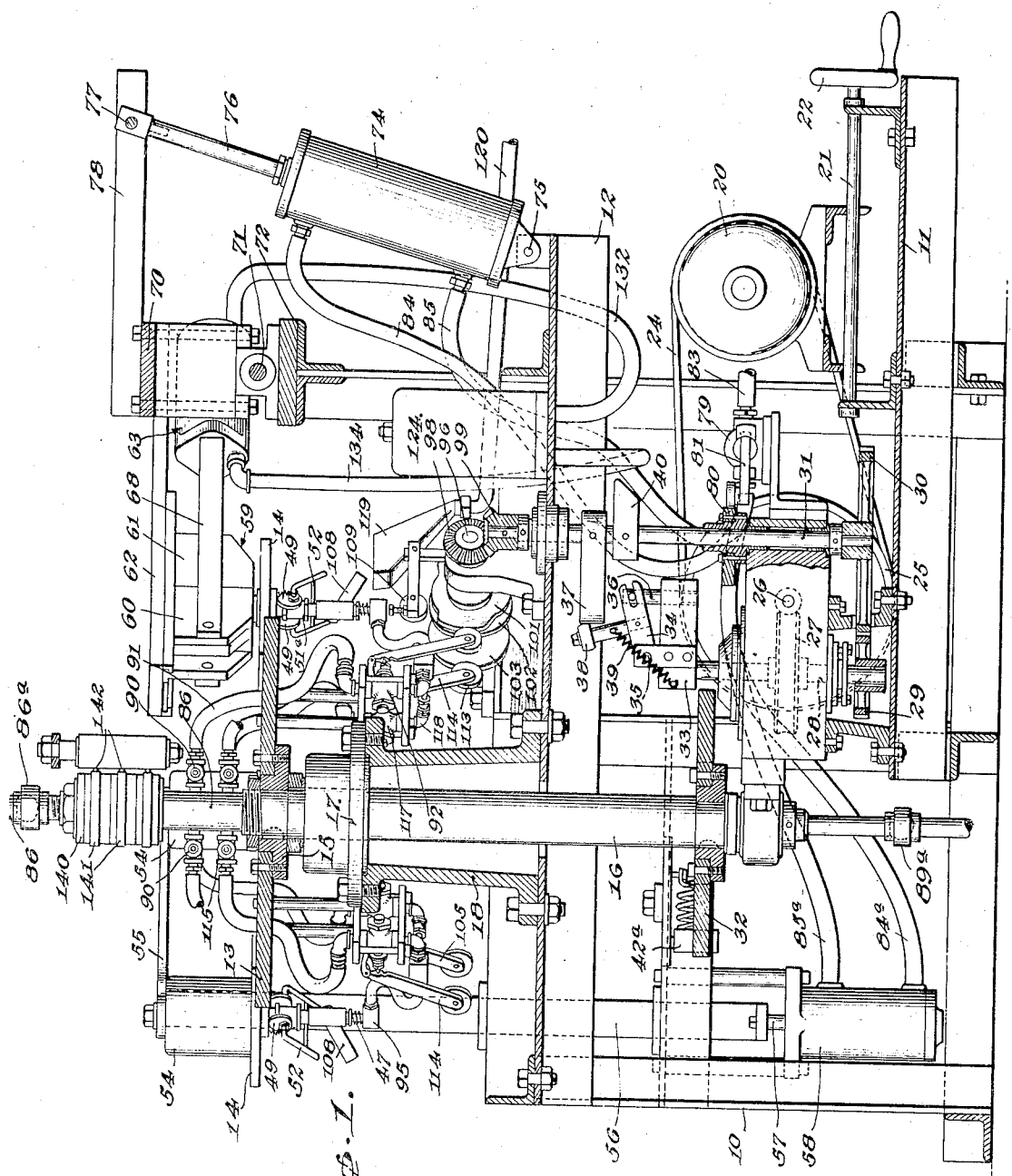
Fig. 1 is a sectional elevation of a machine constructed in accordance with the present invention.

Referring to the drawings, the machine comprises a framework 10 on which is mounted a lower platform 11 supporting the driving mechanism and an upper platform 12. An intermittently rotated carriage includes a circular work table 13 on which an annular series of work-piece supporting plates 14 is mounted. The work table is bolted to a hub 15 (Fig. 2) keyed to a vertical shaft 16 for rotation therewith. The shaft is journalled in a bearing head 17 bolted to a standard 18 mounted on the platform 12.

The driving mechanism for rotating the carriage includes an electric motor 20 which may be driven continuously. The motor as shown is mounted on parallel rods 21 and is adjustable therealong by a hand crank 22 on an adjusting shaft 23. The motor has driving connection through a belt 24 and pulley 25 with a worm shaft 26 which drives a worm wheel 27 keyed on a shaft 28. A pinion 29 on the shaft 28 drives a gear 30 on a vertical cam shaft 31.

The carriage is driven intermittently, step by step, by means of a Geneva drive including a Geneva gear wheel 32 keyed to the carriage shaft 16. An arm 33 having a fixed mounting on the shaft 28 carries a rock arm 34 connected thereto by a pivot 35. The rock arm operates to move a pin 36 up and down in the arm 33. The rock arm 34 is swung upward to the position shown in Fig. 1 by a tappet 37 keyed to the shaft 31 and arranged to engage a roll 38. The arm 34 is held in its lifted position by a coil spring 39. A cam 40 on the shaft 31 is adapted to strike the arm 34 and start it downward, the spring 39 then completing its downward movement into position to drive the Geneva gear 32. The diameters of the gears 29 and 30 are in the ratio of 1 to 2 so that the shaft 28 makes two rotations for each rotation of the shaft 31. During one rotation of the shaft 28, the driving pin 36 is in its lowered position and engages one of the radial slots 41 in the gear 32 and imparts a step rotation thereto. The tappet 37 then lifts the pin 36 to an inoperative position so that the carriage remains at rest during the next rotation of the shaft 28. The carriage is held stationary by a brake 42ª (Fig. 4).

Each of the plates 14 (Fig. 2) has mounted thereon a tubular work-holder 42. Extending through said holder is a tubular shaft 43 carrying a head 44, said shaft having a limited up and down movement within the holder 42, permitting said head to clamp a hollow blank or preform 45 onto the holder. A tubular rod 46 extends lengthwise through the tube 43 and has a limited up and down movement relative to said tube. A coil spring 47 holds the rod 46 in its lowered position in which a head 48 on the upper end of the rod is in sealing engagement with the head 44. The tube 43 is held in its lowered position for gripping the blank by means of a pair of cams 49 adapted to rock on pivot pins 50 on a collar 51 on the tube 43. Screw threaded lock nuts 51ª are provided on the tube 43 for vertical adjustment of the collar 51. The cams may be rocked by a handle 52 (Fig. 1) to release the tube 43 and permit it to be lifted by springs 53 for releasing the work-piece.

The machine is designed and adapted for various modes of operation, and as the description of the mechanism proceeds, one method of operation will be set forth, followed by a description of other methods. In accordance with one such method, the operator places blanks 45 on the work-holder 42 at a loading station a (Fig. 3), and as the carriage is rotated step by step, each work-piece is brought in succession to stations a, b, c, d, e and f. At stations b and c, the blanks are enclosed in heating cups or drums 54 which may be heated by electric coils or other heating means, thereby providing heating chambers in which the blanks are heated to desired temperatures. At station b the blanks are given a preliminary heating and at station c they are heated to a temperature at which they are sufficiently soft and plastic to permit them to be blown to finished form in a blow mold at station d. The heating drums 54 are carried on a pair of arms 55 attached to the upper end of a vertical bar 56 (Figs. 1, 3 and 5). The lower end of the bar 56 is attached to a piston rod 57 of an air operated piston motor 58 by which the heating drums are periodically lifted and lowered under the control of valve mechanism as hereinafter described.

The blow mold 59 at station d comprises partible sections 60 and 61 mounted for reciprocating movement on a carrier frame 62. The mold is opened and closed by means of an air operated piston motor 63 (Figs. 1 and 2) comprising a cylinder 64 supported on the frame 62 by means of a strap 65, the cylinder being free for sliding movement lengthwise in said strap. The motor includes a piston 66 and piston rod 67, the latter connected directly to the mold section 61. The motor cylinder is connected to the mold section 60 by a pair of bars 68. When air under pressure is admitted to the inner end of the motor cylinder (Fig. 2), the piston moves to the right, withdrawing the mold section 61 to the dotted line position where it is arrested by a stop 69. The pressure within the cylinder then reacts to move the cylinder to the left, thereby moving the mold section 62 to the dotted line position, thus completing the opening of the mold.

The frame 62, which carries the blow mold 59 and its motor, is bolted or otherwise rigidly attached to one end of a cross-beam or frame 70 extending transversely of the machine and mounted to rock about a pivot 71 supported on a standard 72 rising from the platform 12. A frame 62ª similar to the frame 62 is attached to the opposite end of the beam 70 and carries at station e a mold 73 and its operating motor 73ª which may be in all respects similar to the mold 59 and motor 63. The mold 73 serves in certain methods of operation, as a cooling mold in the manner hereinafter described.

The beam 70 is rocked for lifting and lowering the molds, by a piston motor 74 pivotally mounted at 75 on the platform 12 and comprising a motor piston rod 76, the outer end of which is connected by a pivot 77 to a pair of angle bars 78 fixed to the beam 70. The operation of the piston motor 74 is controlled by a valve 79 (Figs. 1 and 4) which opens a pressure line 83 alternately to pipes 84 and 85 leading to the upper and lower ends respectively of the motor cylinder. The valve is operated by a cam 80 secured to the shaft 31. As the shaft rotates the cam operates to swing an arm 81 about a pivot 82. This moves the valve stem inwardly, thereby opening the pressure line 83 to the pipe 84. This operates to lower the motor piston and swing the beam 70 about its pivot 71, thereby lifting the molds which at this time are in open position. When the cam 80 runs off the arm 81, the valve 79 is reversed, thereby connecting the pipe 85 to the pressure line so that the motor 74 operates to lower the molds. The valve 79 is of conventional construction for connecting each of the pipes 84, 85 to exhaust when the other is connected to the pressure line. The air motor 58 is also controlled by the valve 79. Pipes 84ª and 85ª, corresponding to the pipes 84 and 85, extend from the motor 58 to the valve, so that the air motors 58 and 74 operate simultaneously for lifting the heaters 54 and the molds, and also lower them simultaneously.

After the blow mold 59 has been lowered and closed around a blank 45, the latter is blown to its finished form within the mold. The air pressure system for supplying blowing air to the blanks comprises a pipe 86 and a swiveled coupling 86ª (Fig. 1) through which air under pressure is conducted from any suitable source (not shown) into a channel 87 (Fig. 2) extending downwardly through the upper end of the shaft 16. A plug 88 separates the channel 87 from a passageway 89 extending downward to the lower end of the shaft. Distributing heads 90 on opposite sides of the shaft 16 are tapped into the channel 87 and distribute the air under pressure to pressure lines leading to the work-piece holders, said lines including pipes 91 individual to the work-piece holders. The pipes 91 extend downward through openings in the table 13 and are connected to valves 92 mounted in frames 93 attached to the lower ends of posts 93ᵃ depending from the table. Each pressure line is continued from its valve 92 through a pipe connection 92ᵃ to a junction box 92ᵇ and thence through a flexible hose 94 to an elbow 95 attached to the lower end of the tubular rod 46. Check valves 92ᶜ are provided to prevent reverse flow of the fluids in the various lines.

Cam mechanism for actuating the valves 92, for lifting the rods 46, and for controlling the application of cooling fluid to the molds, includes two cam shafts 96 and 97 (Figs. 1, 3 and 7) mounted in bearings on the machine frame. Each cam shaft carries a bevel gear 98 running in mesh with a gear 99 keyed to the upper end of the shaft 31. Keyed to each of the shafts 96 and 97 are cams 101, 102 and 103. The cam 101 operates through a cam roll 104 and lever 105 fulcrumed at 106, to move the valve stem 107 inward and thereby open the valve 92. This establishes the air pressure line through said valve to and through the rod 46 into the mold for blowing the blank to final form. After the blowing operation is completed, and the valve 92 again closed, the cam 102 operates to lift the rod 46 and head 48, thereby opening a passageway from the interior of the blown article downwardly between the rod 46 and tube 43 to an outlet 108. The cam 102 operates through a roll 109 carried on an arm 110 pivoted at 111, said arm carrying an adjustable contact piece 112 to engage the elbow 95.

If desired, the blown article may be cooled while still enclosed in the blow mold 59 by means of water, air or other cooling fluid. The cooling fluid is introduced at the lower end of the shaft 16 through a swiveled pipe connection 89ᵃ and extends upwardly through the passageway 89 and is distributed by heads 115 to pipes 116 individual to the work-holders. The pipes 116 extend to valves 117 mounted beside the valve 92 in the frames 93. The valves 117 are under the control of the cam 103 on the shaft 96 while at the blowing station d, provided the cam is in operative position on the shaft, and are actuated by said cam operating through a cam roll 113 and an arm 114 in the same manner as above described in connection with the valves 92. The cam 103 is timed to open its valve 117 while the stem 46 is held in its lifted position by the cam 102. The valve 117 has a pipe connection 118 with the junction box 92ᵇ and thence through the pipe 94 with the rod 46 so that when the valve 117 is opened, the cooling fluid is admitted to the blown article and may be applied in the form of a spray to the interior surface of the article. The cooling fluid is discharged through the outlet pipe 108, trough 119 and pipe 120 (Fig. 1). After the valve 117 has been closed and while the rod 46 is still in an elevated position, the valve 92 may again be opened for an instant in order to blow out any remaining quantity of coolant.

The operation of the piston motor 63 for opening and closing the blow mold 59 is controlled by a valve 122 (Fig. 2) actuated by an electromagnet 123, the valve and electromagnet being mounted within a control box 124 (Fig. 1). The electromagnet in turn is controlled by a cam 125 on the cam shaft 96 (Figs. 2 and 7). Said cam operates a lever 126 fulcrumed at 127 and carrying a rod 128 which, when depressed, separates a pair of switch contacts 129 in the circuit of the electromagnet which is connected to any suitable source of electric current supply. A switch 130 is also connected in the electromagnet circuit and is closed by an adjustable contact piece 131 on the frame 62 when the mold is swung downward to operative position, the switch 130 being automatically opened when the mold is again lifted. While the mold 59 is in its lifted position it is also held open.

When the mold is swung downward for enclosing the blank, the closing of the switch 130 completes a circuit for the electromagnet winding, the contacts 129 being in closed position at this time. This causes the electromagnet to actuate the valve 122 and thereby open an air pressure line through the valve and a pipe 132 (Fig. 1) to the outer end of the motor cylinder so that the piston is moved inwardly to close the mold. The mold remains closed until the high portion of the cam 125 runs off the cam roll and permits the arm 126 to be lowered by a spring 133 so that the rod 128 operates to separate the contacts 129, thereby deenergizing the electromagnet and reversing the valve 122. This establishes a pressure line through the valve and a pipe 134 to the inner end of the motor cylinder so that the motor operates to open the mold. The mold is then swung upward in the manner heretofore described. As the magnet circuit is always open at the switch 130 except when the mold is in its lowered position, closing of the mold while the mold is lifted is positively prevented.

The blow mold 59 may be heated by electrical heating elements 135 (Fig. 3) automatically controlled in a conventional manner for maintaining the mold at any temperature which may be required for preventing undue chilling of the parison before it has been completely expanded to the form of the mold. As above described, the blown article while still retained in the mold may be subjected to a cooling fluid by which its temperature is lowered sufficiently to solidify or set the thermoplastic material so that it will retain its shape. This cooling operation may cool the molds to some extent but such cooling does not penetrate the mold walls to any great depth, so that the mold is quickly reheated to operating temperature by the heating elements 135.

As above described, the cooling and setting of the blown article may take place within the mold 59, the application of cooling fluid being under the control of the cam 103. If desired, however, the cooling operation may be deferred until the article has been transferred to the mold 73 at station e. To accomplish this, the cam 103 is shifted lengthwise of the cam shaft to an inoperative position as shown in Fig. 7 so that the valve 117 at station D remains closed. The cams 101 and 103 on both the cam shafts 96 and 97 are preferably shiftable individually into and out of operative position as may be required, depending upon the particular method in use and desired order of the blowing and cooling operations.

Assuming that the cam 103 at the station d is in its inoperative position (Fig. 7) so that no cooling operation takes place at this station, the blown article will remain in a more or less heated and plastic condition during its transfer to the station e and its enclosure within the mold 73. It may then be necessary or desirable to apply a secondary or final application of blowing air to the article if it has shrunk or become distorted or out of shape during the transfer, this final blowing serving to restore it to perfect form and maintain it in such form until it has been cooled. The final blowing at station e is under the control of the cam 101 at said station. If desired, the mold 73 may be provided with electrical heating elements such as above described in connection with the mold 59.

After the final blowing in the mold 73, the cam 102 at this station may operate as before described to lift the valve rod 46, permitting a circulation of the air through the blown article and outward through the discharge pipe 108. This may serve for cooling the article. After the final blowing operation the article may be subjected to a final cooling operation under the control of the cam 103 at the station e. If a cooling liquid has been employed in this manner, the article may be dried before being discharged from the mold by holding the valve rod 46 lifted, the cam 102 being set for this purpose, and circulating air through the article under the control of the cam 101.

A further method which may be employed consists of blowing the parison first in the blow mold at station d and without thereafter applying a cooling liquid at said station, transferring the article to station e, and blowing it in the mold 73, the latter being kept cool or comparatively cold so as to chill and set the article without requiring the application of a cooling liquid.

In accordance with the above described methods of operation the mold carriage is given step rotations through angles of 60° each, bringing each mold to rest at each of the six stations in succession. In the manufacture of some articles it is practical to complete the heating of each blank or preform in a single heating cylinder 54 and to effect the blowing and cooling operations in a single mold. This with the machine disclosed permits two articles to be completely heated at the same time in the two heating chambers, and two other articles to be blown and cooled concurrently in the two molds, so that the output of the machine is thus doubled or multiplied. This requires the mold carriage to be indexed through 120° instead of 60° at each step rotation.

Fig. 6 illustrates a modified form of driving mechanism for this purpose. As here shown, the Geneva wheel 32 may be formed with only three radial slots 41. Intermeshing gears 136 and 137 of equal diameter are mounted on the shafts 31 and 28 respectively, these gears replacing the gears 30 and 29 (Fig. 1). The arm 33 in this instance carries a pin 138 fixed to the arm for engaging the slotted wheel 32. The latter is thus indexed once during each rotation of the shaft 28 and through an angle of 120°. With this construction the tappet 37 (Fig. 1), cam 40 and lifting arm 34 are unnecessary and may be omitted.

In operating the machine with this modified form of drive the operator places blanks on the holders 42 at stations a and f after each step rotation of the carriage. These blanks are thus brought to the two heating chambers at stations b and c simultaneously and are heated to the required temperature at said stations. The next step rotation of the carriage brings the two heated blanks to stations d and e where they are enclosed in the two molds 59 and 73. The operations at these two stations are preferably identical. These may comprise blowing the articles in the molds under the control of the cams 101. The cams 102 may then operate to lift the rods 46 and vent the molds. This operation may be succeeded by the application of a cooling fluid under the control of the cams 103. Air may then be circulated for drying the article under the control of the cams 101. The next step rotation of the carriage brings the completed articles to stations a and f and they are then removed from the machine.

Electric current may be supplied to heating elements 139 in the plates 14, from any suitable source of current, through a distributor 140 (Figs. 1 and 2) comprising collector rings 141 engaging stationary contacts 142. Three collector rings are shown, permitting current to be drawn from either a three-phase or two-phase alternating current system or a direct current system. The current is supplied to the heating elements either at predetermined periods during the cycle of operations or continuously as desired. For example, the plates 14 may be electrically heated while the blanks are being heat treated in the molds and/or heating cylinders, to maintain the holders 42 at the desired temperatures.

Modifications may be resorted to within the spirit and scope of our invention.

We claim:

1. A machine for fabricating articles from thermoplastic materials, comprising a carriage, blank holders thereon, means for rotating the carriage intermittently step by step and thereby bringing the holders in succession to a blowing station, a blow mold at said station, a stationary support on which the mold is mounted independently of the carriage, means for closing the mold around a blank at said station, a tube projecting into the blank while the latter is enclosed by the mold, means cooperating with said tube for sealing the open end of the blank, means including an air pressure line extending to said tube for supplying air under pressure through said tube and thereby blowing the blank within the mold, a valve in said line controlling said air supply, means for venting the blank to the atmosphere, means for conducting a cooling liquid through said tube and spraying the interior surface of the blown article therewith, a valve controlling the flow of said liquid to the said tube, automatic means for actuating said valves in succession in a predetermined time relation, and means for blowing drying air through said tube after said spraying and while the article is vented to the atmosphere.

2. A machine for fabricating hollow articles of thermoplastic material, comprising a carriage, an annular series of units thereon, each unit comprising a vertical tubular work-holder, a tube extending therethrough, a head on the upper end of said tube and of greater diameter than the interior of the work-holder, means for moving said tube up and down and causing said head to clamp the open end of a hollow blank to the upper end of the work-holder, means for rotating the carriage step by step and thereby bringing said units in succession to a blowing station, a partible blow mold at said station, a stationary support on which the blow mold is mounted independently of the carriage, means for closing the mold about a blank with the lower end of the mold closed about the upper end of the work-holder and with the mold extending upwardly from said work-holder, and means for supplying air through said tube for expanding the blank within the mold.

3. A machine for fabricating hollow articles of thermoplastic material, comprising a carriage, an annular series of units thereon, each unit comprising a vertical tubular work-holder, a tube extending therethrough, a head on the upper end of said tube and of greater diameter than the interior of the work-holder, means for moving said tube up and down and causing said head to clamp the open end of a hollow blank to the upper end of the work-holder, means for rotating the carriage step by step and thereby bringing said units in succession to a blowing station, a partible blow mold at said station, a stationary support on which the blow mold is mounted independently of the carriage, means for closing the mold about a blank with the lower end of he mold closed about the upper end of the work-holder and with the mold extending upwardly from said work-holder, means for supplying air through said tube for expanding the blank within the mold, automatic means for circulating a cooling liquid through the blown article, and means for drying the article while enclosed within the mold.

4. A machine for fabricating hollow articles of thermoplastic material, comprising a carriage, an annular series of units thereon, each unit comprising a tubular work-holder, a tube extending therethrough, a head on said tube, means for moving said tube up and down and causing said head to clamp the open end of a hollow blank to the work-holder, means for rotating the carriage step by step and thereby bringing said units in succession to a blowing station, a partible blow mold at said station comprising mold sections movable horizontally to and from a mold closing position, a piston motor, a support on which the motor and said mold sections are mounted, said motor comprising a piston connected to one mold section and a cylinder mounted for lengthwise reciprocation on said support, and means connecting the cylinder to the other mold section.

5. A machine for fabricating articles of thermoplastic material comprising a carriage, means for rotating the carriage step by step, blank holders on the carriage brought in succession to a blowing station by the rotation of the carriage, a sectional blow mold at said station, a supporting frame on which the mold sections are mounted for sliding movement to and from a mold closing position, a piston motor comprising a piston connected to one mold section and a cylinder slidable on said supporting frame and connected to the other mold section, said frame mounted to swing about a stationary axis for lifting and lowering the mold, and a mold lifting motor connected to said frame.

6. A machine for fabricating articles of thermoplastic material comprising a carriage, means for rotating the carriage step by step, blank holders on the carriage brought in succession to a blowing station by the rotation of the carriage, a sectional blow mold at said station, a supporting frame on which the mold sections are mounted for sliding movement to and from a mold closing position, a piston motor comprising a piston connected to one mold section and a cylinder slidable on said supporting frame and connected to the other mold section, said frame mounted to swing about a stationary axis for lifting and lowering the mold, a piston motor operatively connected to said swinging frame for swinging the mold to and from operative position, and timing mechanism controlling the operations of said piston motors.

7. A machine for fabricating articles of thermoplastic material comprising a carriage mounted for rotation about a vertical axis, means for rotating the carriage step by step, blank holders on the carriage and brought in succession by the rotation of the carriage to a plurality of molding stations, partible molds at said stations, supporting frames individual to said molds and each extending radially of the carriage, piston motors individual to said molds mounted on said supporting frames, said frames mounted to rock as a unit about a stationary horizontal axis and thereby swing the molds and their supporting frames up and down, and a motor connected for rocking said frames.

8. A machine for fabricating hollow articles of thermoplastic material comprising a carriage mounted for horizontal rotation, means for rotating the carriage, an annular series of work-holders on the carriage, means cooperating with said work-holders for attaching hollow blanks thereto, said work-holders being brought in succession to a blowing station by the rotation of the carriage, a blowing mold at said station, means for closing the mold around a blank, a blowing system comprising air pressure lines individual to and communicating with said holders, valves in said lines, a cooling system comprising pipe lines individual to said holders through which cooling liquid is transmitted through the holders to the blanks while the latter are enclosed in the mold, valves in the cooling system and individual to said pipe lines, a cam shaft, cams thereon controlling respectively the valves in the air pressure lines and the valves in said cooling system, valve operating devices individual to said valves and brought into operative relation to said cams by said rotation of the carriage, and means for driving the cam shaft.

9. A machine for fabricating hollow articles of thermoplastic material, said machine comprising a carriage rotatable horizontally, work-holders on the carriage, means for rotating the carriage intermittently step by step and thereby bringing each work-holder to a plurality of heating stations in succession, heating drums individual to said stations, a motor, operating connections between the motor and said drums for simultaneously lifting the drums as a unit, and controlling means by which the drums are caused to be lowered for enclosing and heating blanks of the material at said stations and thereafter lifted and by which a lowering and lifting of the drums takes place after each step movement of the carriage and while the carriage is stationary.

10. A machine for fabricating hollow articles of thermoplastic material, said machine comprising a carriage rotatable horizontally, work-holders on the carriage, means for rotating the carriage intermittently step by step and thereby bringing each work-holder to a plurality of heating stations in succession, heating drums individual to said stations, a motor, operating connections between the motor and said drums for simultaneously lifting the drums as a unit, a blow mold, a motor for lifting and lowering the blow mold, valve mechanism controlling the operation of said motors, and means for actuating the valve mechanism in timed relation to the step movements of the carriage and causing the mold and heating drums to be lowered and lifted during each rest period between indexing movements of the carriage.

11. A machine for fabricating hollow articles of thermoplastic material, said machine comprising a carriage rotatable horizontally, work-holders on the carriage, means for rotating the carriage intermittently step by step and thereby bringing each work-holder to a plurality of heating stations in succession, heating drums individual to said stations, a motor, operating connections between the motor and said drums for simultaneously lifting the drums as a unit, a blow mold, a motor for lifting and lowering the blow mold, valve mechanism controlling the operation of said motors, and means for actuating the valve mechanism in timed relation to the step movements of the carriage and causing the mold and heating drums to be lowered and lifted during each rest period between indexing movements of the carriage, said mold comprising partible sections, a motor operatively connected to said sections for closing and opening the mold, and electro-responsive means controlling said opening and closing of the mold and operable to prevent closing of the mold except when the latter is in its lowered position.

12. The combination of a carriage, means for rotating it step by step about a vertical axis, a work-holder on the carriage, a sectional mold, a supporting frame on which the mold sections are mounted, a motor operatively connected to the mold sections for closing and opening the mold, means for lifting and lowering the mold from and toward the carriage, and electro-responsive control means for preventing closing of the mold while in its lifted position.

13. The combination of a carriage, means for rotating it step by step about a vertical axis, a work-holder on the carriage, a sectional mold, a supporting frame on which the mold sections are mounted, an air motor operatively connected to the mold sections for opening and closing the mold, an air pressure line to the motor, a valve in said line controlling the air supply to said motor, and electro-responsive means for automatically controlling the operation of said valve and preventing closing of the mold while in its lifted position.

14. The combination of a carriage, means for rotating it step by step about a vertical axis, a work-holder on the carriage, a sectional mold, a supporting frame on which the mold sections are mounted, an air motor operatively connected to the mold sections for opening and closing the mold, an air pressure line to the motor, a valve in said line controlling the air supply to said motor, an electromagnet operatively connected to said valve, means providing an electric circuit for the electromagnet, a switch in said circuit, and means for actuating said switch when the mold is lowered to operative position.

15. The combination of a carriage, means for rotating it step by step about a vertical axis, a work-holder on the carriage, a sectional mold, a supporting frame on which the mold sections are mounted, an air motor operatively connected to the mold sections for opening and closing the mold, an air pressure line to the motor, a valve in said line controlling the air supply to said motor, an electromagnet operatively connected to said valve, means providing an electric circuit for the electromagnet, a switch in said circuit, means for actuating said switch when the mold is lowered to operative position, a second switch in said circuit, a cam controlling said second switch, and means for actuating said cam in synchronism with the step movements of the carriage.

16. The combination of an electric motor, a shaft driven continuously thereby, a cam, driving connections between the cam and said shaft for rotating the cam at the same angular speed as said shaft, a second shaft geared to said first mentioned shaft for rotation at a higher speed, a carriage mounted for rotation, a Geneva wheel connected to the carriage, a driver connected to said second shaft and operable to index the Geneva wheel during a rotation of the shaft and thereby impart a step rotation to the carriage, and means to render said driver inoperative during alternate rotations of said second shaft and thereby cause the carriage to be given but one step rotation for each complete rotation of said cam.

17. The combination of an electric motor, a shaft driven continuously thereby, a cam, driving connections between the cam and said shaft for rotating the cam at the same angular speed as said shaft, a second shaft geared to said first mentioned shaft for rotation at a higher speed, a carriage mounted for rotation, a Geneva wheel connected to the carriage, a driver connected to said second shaft and operable to index the Geneva wheel during a rotation of the shaft and thereby impart a step rotation to the carriage, means to render said driver inoperative during alternate rotations of said second shaft and thereby cause the carriage to be given but one step rotation for each complete rotation of said cam, work-holders on the carriage for holding blanks of thermoplastic material, said work-holders being brought in succession to heating and molding stations by the step rotations of the carriage, and a heating drum and blow mold located respectively at said heating and molding stations.

VICTOR E. HOFMANN.
JOHN M. BLANK.